United States Patent

[11] 3,599,878

| [72] | Inventors | Floyd E. Buschbom<br>Long Lake;<br>Glen D. Hansen, Maple Plain, both of,<br>Minn. |
|------|-----------|----|
| [21] | Appl. No. | 831,862 |
| [22] | Filed | June 10, 1969 |
| [45] | Patented | Aug. 17, 1971 |
| [73] | Assignee | Van Dale Corporation<br>Long Lake, Minn. |

[54] DISTRIBUTOR APPARATUS
25 Claims, 6 Drawing Figs.

[52] U.S. Cl. .................................................. 239/665,
214/17.64, 239/684
[51] Int. Cl. ....................................................... A01c 17/00
[50] Field of Search........................................... 239/97, 98,
684, 681, 227, 229, 264; 214/17.64

[56] References Cited
UNITED STATES PATENTS

| 3,206,044 | 9/1965 | Schwichtenberg............ | 214/17.64 |
| 3,282,591 | 11/1966 | Donelson, Jr.................. | 239/665 |
| 3,349,929 | 10/1967 | Berger........................... | 214/17.64 |
| 3,349,930 | 10/1967 | Welborn........................ | 214/17.64 |
| 3,430,788 | 3/1969 | Edming......................... | 239/665 |

*Primary Examiner*—Lloyd L. King
*Attorneys*—Donald R. Sjostrom and Robert P. White ABSTRACT: A distributor apparatus for distributing particulate material such as ensilage in a storage container such as a silo. The distributor is movable toward and away from the center of the silo on a fixed track. The distributor includes a distributor disc which is inclined with respect to the horizontal and rotates about an axis forming an acute angle with the vertical while simultaneously orbiting in a generally circular path in a horizontal plane about the fixed motor which drives the distributor disc. A nonrotating baffle or guide member orbits with the disc and is disposed so as to receive material from a gooseneck substantially at the center of the silo and to direct it onto the distributor disc. This guide means forms an acute angle with both the vertical and with the distributor disc.

INVENTORS
GLEN D. HANSEN,
FLOYD E. BUSCHBOM
BY
Donald R. Jostrom
ATTORNEY

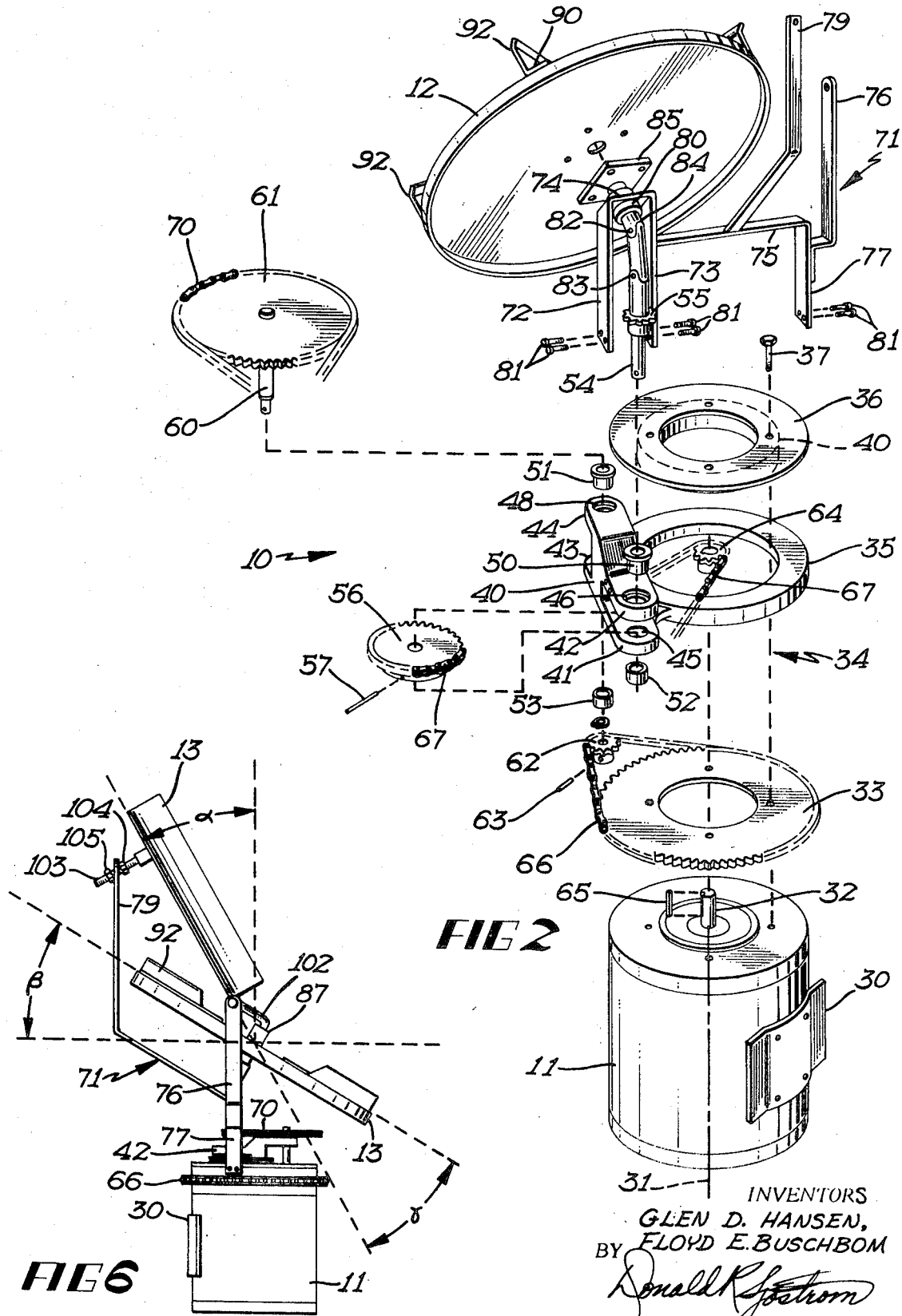

INVENTORS
GLEN D. HANSEN,
FLOYD E. BUSCHBOM
BY
Donald R. Sjostrom
ATTORNEY 3,599,878

DISTRIBUTOR APPARATUS

BACKGROUND OF THE INVENTION

This invention relates to distributors for particulate material, particularly to silage distributors for use with tower silos. Many types of silage distributors are presently being used and many others have been proposed in an effort to evenly distribute the silage in the silo to prevent separation of the constituents and to avoid placing undue stress on the silo structure due to uneven loading. The need for such distributors has become increasingly great with the present trend toward larger and taller silos. One of the most successful types of distributors makes use of a spinning distributor disc mounted generally at the center of the silo directly below the gooseneck which guides the ensilage from a vertical filler pipe on the outside of the silo, through an arcuate path, and generally vertically downward onto the distributor disc. As the material strikes the spinning disc, it is spread outwardly toward the walls of the silo. It has been found that a more effective and satisfactory distribution can be obtained by having the disc simultaneously rotate and orbit in a generally horizontal circular path. This structure is shown, for example, in the Robert E. Welborn U.S. Pat. No. 3,349,930 and in the pending application Ser. No. 683,355 of Floyd E. Buschbom, now U.S. Pat. No. 3,490,618. In these prior devices the spinner disc rotated about a vertical axis thus rotating and orbiting both in the same horizontal plane. The motor driving the spinner disc orbited with it, thus requiring a relatively complex structure and mounting arrangement.

Along with the trend towards larger and taller silos, there has also been a trend toward much larger blowers powered by relatively high horsepower tractors. For example, 5-foot diameter blowers powered by tractors exceeding 100 horsepower are being used in some instances today. With this large equipment, which is used with self-unloading wagon boxes or trucks, an extremely large volume of material per unit time is placed into the silo and onto the distributor. For example, a 5-ton load of ensilage may be unloaded in a matter of a very few minutes. In many instances, particularly with high-density material such as corn silage, the distributors have simply not been able to handle this large volume of material, or, in order to do so have required large amounts of power necessitating the use of driving motors which are large and costly and impractical for use in a distributor which must be suspended in the silo.

It has become apparent that there is a real need for a relatively simple distributor which can handle large volumes of high-density material with a relatively small power input and still provide a substantially uniform distribution pattern in the silo.

BRIEF SUMMARY OF INVENTION

The present invention provides a relatively simple distributor for particulate material such as ensilage. It is capable of handling relatively large volumes of high-density material without requiring an excess amount of power and while maintaining a substantially uniform distribution pattern within the silo. One feature of the invention is the provision of a fixed motor with a motor frame which acts as a mounting or frame structure for the entire distributor apparatus which is rotatably mounted thereon and which orbits around the axis of the motor. This provides for a compact and simple structure and allows the mounting of the distributor so that its support can be simply accomplished by the simple application of mounting means on the motor frame itself. This feature of the invention may be used in connection with a simple orbiting and rotating spinner disc arrangement such as that disclosed in the Welborn patent and the Buschbom application referred to above, without incorporating the additional features of the present invention.

Another feature of this invention is the provision of a distributor having a simultaneously rotating and orbiting distributor member wherein this distributor member or disc is mounted so that it forms an acute angle with the horizontal. It rotates in a moving plane which forms an acute angle with the horizontal while simultaneously orbiting in a horizontal plane. This substantially reduces the power required to operate the distributor. It is believed that this is due to the fact that the material is moved off from the distributor partially due to gravity thus requiring less power input by the driving motor in order to move a given amount of material.

Another feature of the invention is the provision, with the inclined distributor disc, of an inclined baffle or guide member converging from top to bottom and disposed to receive material from a gooseneck or the like and to guide the material onto the desired position on the distributor disc. This baffle means is mounted so that it orbits with the distributor disc and directs material generally onto the same position on the disc and in approximately the same pattern in all positions thereof. This guide means is disposed at an acute angle with the vertical and also at an acute angle with the face of the distributor disc so that it serves to change the direction of the material prior to its striking the distributor disc. This again causes a portion of the material to strike the disc and simply bounce off or be distributed due to gravity reducing the power input required by the motor. If desired, the baffle angle of inclination may be adjustable so that the optimum relationship for various types of material can be obtained. In the preferred arrangement the motor is fixed and the distributor disc and the baffle member orbit together in a circular path around the vertical axis of the motor.

An object of the invention is to provide a distributor for particulate material such as ensilage or the like, with a simplified construction for providing simultaneous rotation and orbital movement of the distribution disc.

Another object of the invention is to provide a distributor having a fixed driving motor and a distributor disc or member which simultaneously rotates and orbits in a generally circular path about the axis of the fixed motor.

Another object of the invention is to provide an improved distributor for ensilage or the like which is capable of handling large volumes of material of relatively high density with a minimum power input while providing a relatively uniform distribution pattern.

Another object of the invention is to provide a distributor of the type having a distributor member which simultaneously rotates and orbits wherein the member orbits in a generally horizontal plane about a vertical axis but rotates in a moving plane which is inclined so as to form an acute angle with the horizontal.

Another object of the invention is to provide a distributor as described in the preceding object further including a baffle or guide member inclined with respect to the vertical and with respect to the distributor member and adapted to receive particulate material and to direct it onto the distributor member.

Still another object of the invention is to provide a distributor including a baffle member as described in the preceding object wherein the baffle member is mounted so that it travels in an orbital path along with the distributor member.

These and other object of this invention will become apparent upon reading the following detailed description of a preferred embodiment of the invention and wherein reference is made to the accompanying drawing.

DESCRIPTION OF THE DRAWING

FIG. 2 is a exploded perspective view of the distributor.

FIG. 6 is a side view of the distributor, as seen from the left side of FIG. 4.

DETAILED DESCRIPTION OF THE DRAWING

Figure 1:
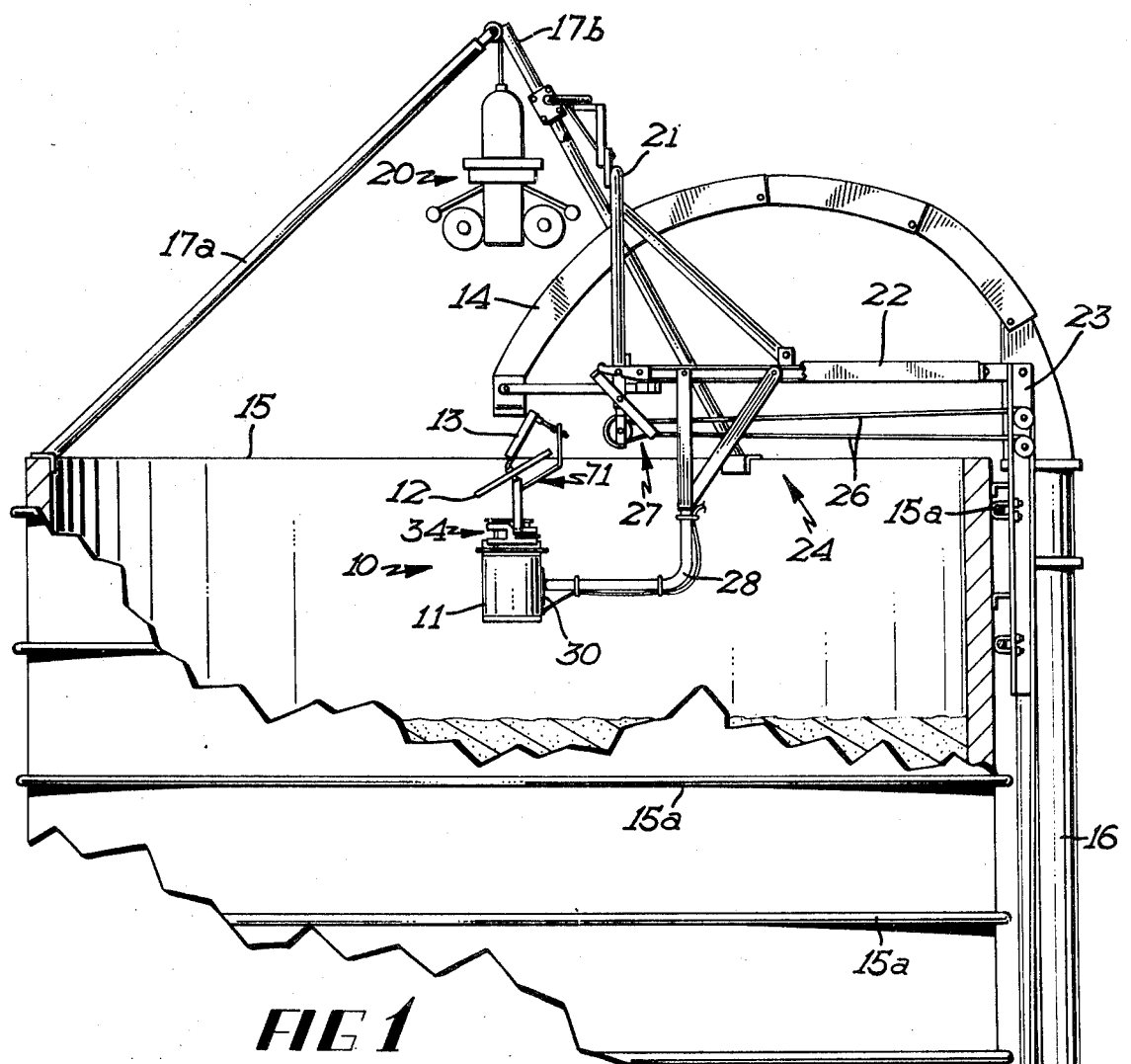
FIG. 1 is a fragmentary side view of a tower silo having mounted therein a silage distributor constructed according to this invention.

Referring first to FIG. 1, reference numeral 10 refers generally to a silage distributor embodying the present invention. This distributor includes a motor 11, an inclined distributor disc 12 and an inclined baffle or guide means 13 which directs silage or other particulate material from a gooseneck 14 onto the distributor disc 12. Gooseneck 14 extends generally radially inward from the edge of a silo 15 to approximately the center thereof. Outside of the silo it connects to a vertically disposed distributor pipe 16 which extends upward from a position near the ground where it attaches to a blower or the like (not shown) for impelling or blowing the material up pipe 16 and into the silo. As can be seen in FIG. 1, gooseneck 14 preferably is generally arcuate in shape comprising approximately a 180° arc so that material is received from the vertical pipe 16 and is dispelled substantially vertically downward onto baffle 13.

Mounted on the top of the silo wall is a tripod 17 which includes legs 17a, 17b and 17c (not shown) which meet above and substantially at the axial center of the silo. Tripod 17 may be used for supporting a suspended silo unloader as is disclosed schematically in FIG. 1 and designated by the numeral 20. Also suspended from the tripod is a yoke 21 which supports the inner end of a track means 22 disposed under gooseneck 14 and extending substantially radially of the silo to a position somewhat short of the center thereof. At its outer end track 22 is supported by angle irons 23 which are connected to the silo itself as by connection to the silo hoops 15a. Mounted on the tracks and movable therealong is a carriage apparatus 24 movable by a remotely operable winch 25 which preferably is located near the ground where it can be readily operated and which is connected to the carriage by an appropriate cable 26. It will be appreciated that operation of the crank of winch 25 will move carriage 24 toward or away from the center of the silo along track 22. A dolly 27 is also movable on track 22 and is connected to the collapsible inner end of gooseneck 14. An appropriate latching apparatus may be provided for latching this end portion in an extended position as disclosed in FIG. 1 and for releasing it to a collapsed position to permit the silo unloader to be raised and lowered. The details of this dolly and latching mechanism have not been disclosed, nor will they be described, since they form no part of the present invention. The carriage 24 has a generally L-shaped arm 28 which extends downwardly and then inwardly from the bottom of carriage 24. At the inner end of arm 28 there is provided an appropriate connection 30 whereby motor 11 is removably mounted on arm 28. Thus, movement of carriage 24 back and forth along track 22 moves distributor 10 toward and away from the center of the silo. In the innermost position of carriage 24 distributor 10 will be disposed substantially at the center of the silo.

Distributor 10 is of the type which has a distributor disc which simultaneously rotates about its own center and travels in a circular orbit. Distributor 10 differs from prior distributors of this type in several ways, including the fact that motor 11 is fixed by its mounting on arm 28 by means of connecting means 30 and the orbit path is about the center axis of the motor. Also, in the past, the distributor disc has rotated in a horizontal plane, namely the plane of the orbit path. In the present distributor, spinner disc 12 is inclined with respect to the horizontal and thus rotates in a traveling plane forming an acute angle with the horizontal plane in which the orbit path lies. Structure by which this unique action may be obtained is disclosed in FIGS. 2 through 6 and can perhaps best be seen by referring to FIG. 2 which is an exploded view.

As seen in FIG. 2, motor 11 has a generally vertical axis 31 and has a vertical output shaft 32 extending upward from its upper end and coaxially with axis 31. Mounted on top of motor 11 and concentric with axis 31 is a relatively large diameter sprocket 33. This sprocket has a central opening and has an outer diameter somewhat greater than the diameter of the motor housing so that it extends radially beyond the housing. Mounted above sprocket 33 is a bearing member 34 including an annular collar 35 which is mounted coaxially with axis 31 and immediately above sprocket 33. Mounted above bearing member 34 is an annular plate 36 having an outside diameter approximately equal to the outside diameter of annular collar 35 and which has a downwardly extending concentric annular flange 40 with an outside diameter substantially equal to the inside diameter of collar 35. Member 36 is also mounted concentric with axis 31 and with flange 40 extended down into the central opening in collar 35 to a point where the underside of flange 40 engages the upper face of sprocket 33. Plate 36 is secured to motor 11 by appropriate means such as bolts 37 which extend through plate 36 and flange 40, through sprocket 33 and into the frame of motor 11 whereby plate 36 and sprocket 33 are fixed to the motor frame and whereby member 34 is rotatably mounted upon the motor.

Bearing member 34 has extending radially from collar 35 a deck or mounting portion 40 which extends generally tangent to collar 35. Generally at its center, deck 40 has a solid portion and it is bifurcated at each of its ends, thus providing a pair of spaced leg members at each end. These include leg members 41 and 42 at one end and leg members 43 and 44 at the other. Leg members 41 and 43 extend substantially in the same plane as collar 35 while leg members 42 and 44 are disposed above the plane of collar 35. Leg members 41 and 42 are generally parallel and substantially identical and have extending therethrough aligned openings 45 and 46, respectively. Leg members 43 and 44 are spaced a distance somewhat greater than are legs 41 and 42 and they have aligned holes 47 and 48, respectively. Appropriate bearings 50 and 51 set into openings 46 and 48, respectively, while bearings 52 and 53 fit into openings 45 and 47, respectively. Extending through vertically aligned openings 45 and 46 and rotatable therein is a shaft 54 which has a relatively small sprocket 55 fixed thereto and disposed immediately above leg 42. Disposed between legs 41 and 42 is a somewhat larger sprocket 56 also secured to shaft 54 by appropriate means such as a pin 57.

Extending through openings 47 and 48, and rotatable therein, is another vertically extending shaft 60. Shaft 60 has fixed at its upper end a relatively large sprocket 61 which is disposed above leg 44 and at its lower end, below leg 43, it has a relatively small sprocket 62 fixed to shaft 60 by appropriate means such as a pin 63. A relatively small sprocket 64 is fixed to motor shaft 32 by appropriate means such as a key 65. The apparatus is constructed so that sprockets 33 and 62 lie substantially in a single horizontal plane beneath the plane of collar 35. These two sprockets are connected by an appropriate chain 66. Sprockets 64 and 56 lie in a second generally horizontal plane, this plane being disposed between legs 41 and 42 of deck 40. Sprockets 56 and 64 are connected by an appropriate chain 67. Disposed in a third horizontal plane, disposed slightly above leg 44 of deck 40, are sprockets 55 and 61 which are connected by an appropriate chain 70.

Connected to bearing 34 in the manner which will be described hereinafter, is a support bracket 71 including an inverted, generally U-shaped portion at the left end (as seen in FIG. 2) having vertically extending spaced leg portions 72 and 73 connected by a bight portion 74. Extending generally horizontally from a point somewhat above the midpoint of leg 73 is a horizontal portion 75 which has extending downward from its remote end a vertically extending leg 79. Extending to the right from leg 79 and then upwardly is another leg 76. Extending rearwardly and upwardly from the upper side of portion 75 is a leg 79 which is apertured near its upper end. Extending through bight portion 74 and inclined at an angle of approximately 60° above the horizontal, is an annular or cylindrical bearing member 80 which is fixed in the bight portion. Bracket 71 is mounted with legs 72 and 73 straddling leg 42 of deck 40 and bolted, at their lower ends, to leg 42 by appropriate means such as capscrews 81. Leg 75 extends substantially diametrically across the top of motor 11 and spaced upwardly therefrom and leg 77 extends downwardly and is attached to collar 35 substantially diametrically opposite from leg 42 by appropriate means such as additional capscrews 81.

Secured to the upper end of shaft 54 by a pair of universal joints 82 and 83, is a shaft 84 which extends through cylindrical bearing 80. At its upper end shaft 84 has secured thereto a square plate 85 with a tapped hole adjacent each corner. Spinner disc 12 is mounted on plate 85 and secured thereto by appropriate means such as bolts 86 which are screwed into these tapped holes. Plate 85 has a centrally located upstanding bearing member 87 extending upward from its top surface and through a central opening in disc 12. Member 87 has a central cylindrical opening 88 at its upper end.

Figure 3:
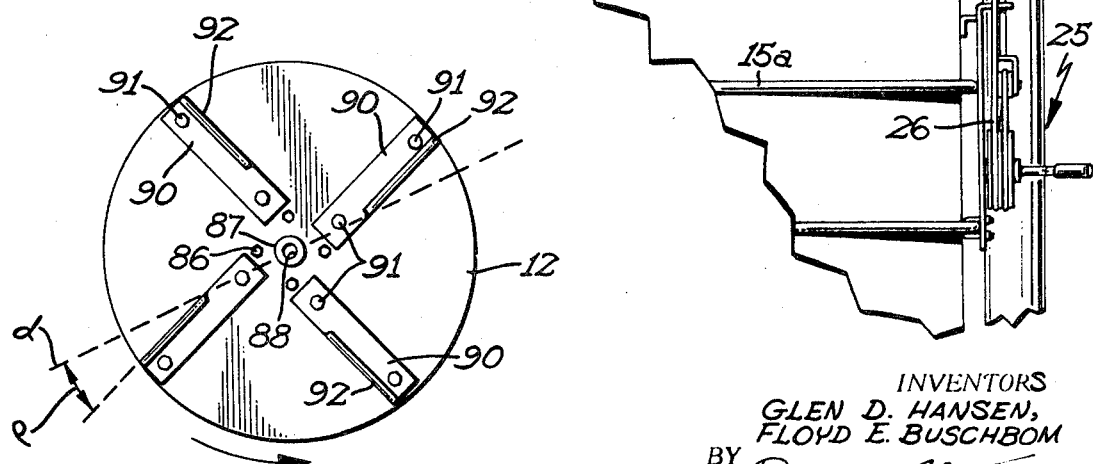
FIG. 3 is a plan view of a distributor disc which forms a part of the distributor of this invention.

The preferred configuration of spinner 12 can best be seen in FIG. 3. As seen there, disc 12 is a generally circular disc with a downwardly extending peripheral flange 89 and a plurality of upstanding vanes 90. Vanes 90 are actually generally L-shaped in cross section having a flat portion which is attached to the upper surface of disc 12 by appropriate means such as screws or bolts 91 and an upstanding paddle portion 92. While the configuration of disc 12 may be varied for different types of materials and for different operating conditions, it has been found that the configuration disclosed in FIG. 3 offers advantages for many applications. Here four vanes are used and they are equally spaced around the disc. However, they are not disposed so that paddle portions 92 extend radially. Rather, they are disposed so that the outer end of each paddle portion leads the diameter $d$ slightly while the inner end of portion 92 is disposed slightly behind the diameter, so that they are disposed at an angle with the diameter. This is believed to give somewhat of a lifting action to the material being distributed and to therefore provide improved distribution, particularly in high-density material.

Figure 5:
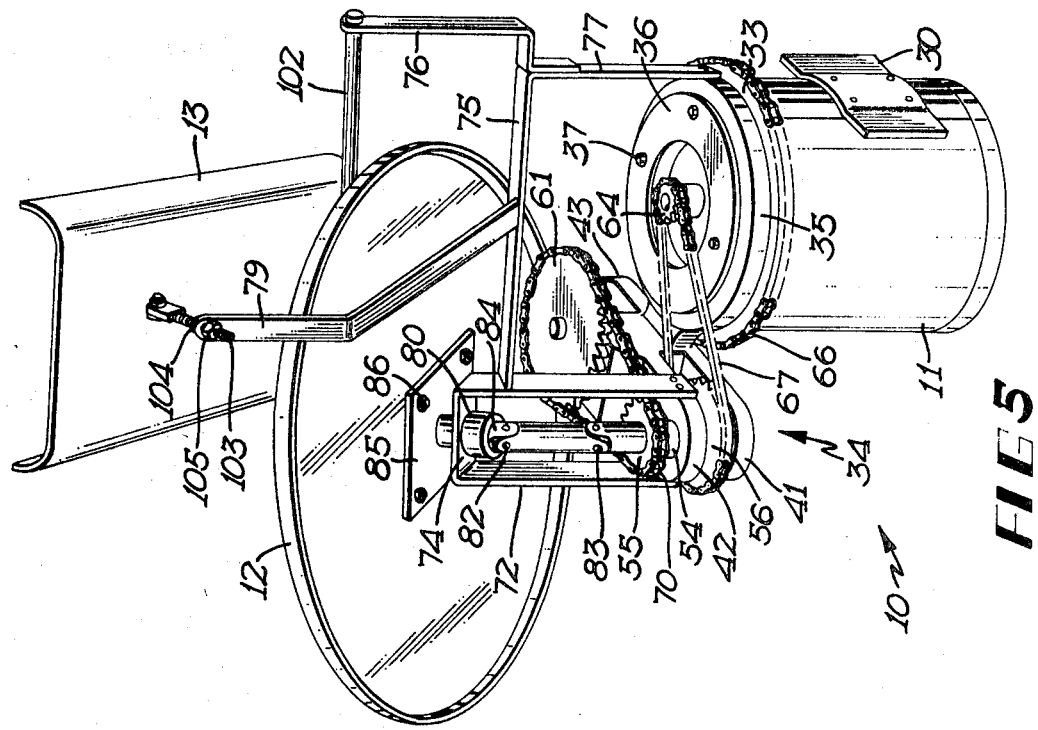
FIG. 5 is a rear view of the distributor.
Figure 4:
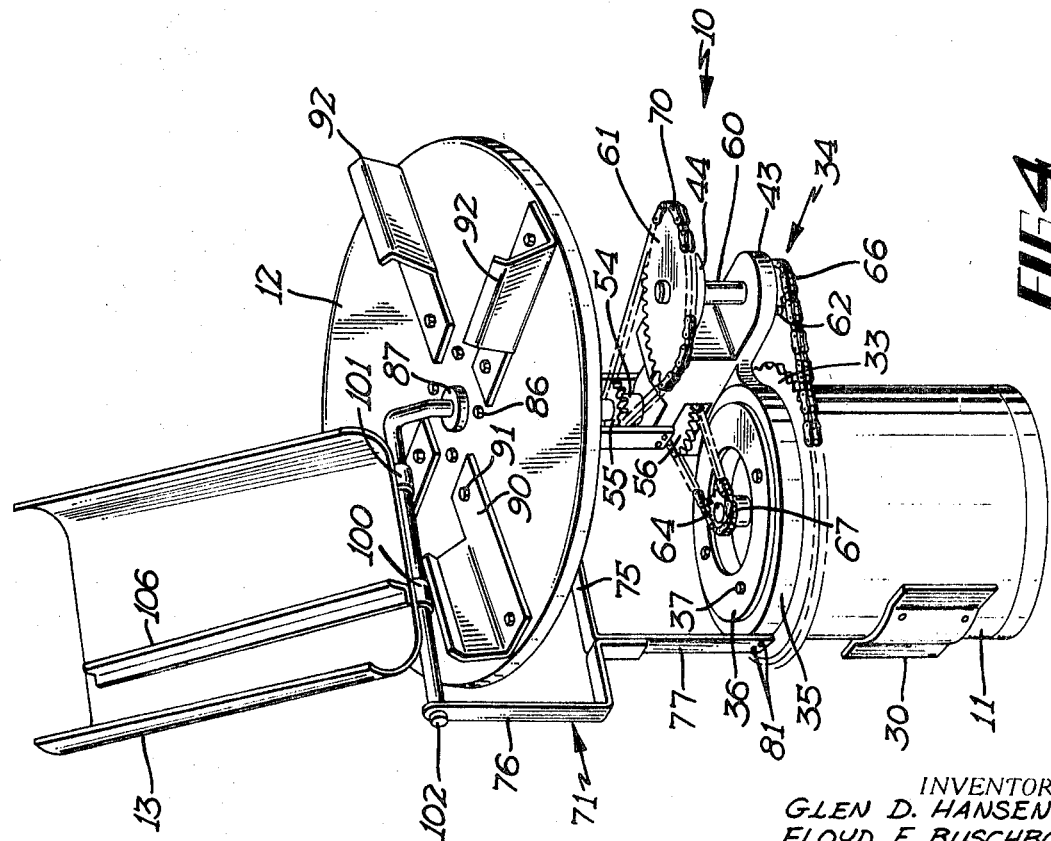
FIG. 4 is a front view of the distributor.

The distributor structure when assembled can be seen better in FIGS. 4, 5, and 6 and these FIGS. should now be referred to. Baffle member 13 has a generally flat back portion and a pair of forwardly extending sides. These sides converge from one end toward the other. At the convergent end, baffle 13 has a pair of spaced clips or fastening members 100 and 101 by which the lower or convergent end of the baffle is rotatably mounted on the horizontal leg of an L-shaped rod or the like 102. This rod has a vertical position on its inner end which fits down into opening 88 at the center of the upstanding cylindrical member 87 on plate 85. It will be recalled that member 87 extends upwardly from the top of distributor disc 12. Member 87 acts as a bearing so that the disc can rotate with respect to rod 102. At the remote end of the horizontal portion of this rod, it extends through an opening in vertical leg 76 of bracket 71. On the back side of baffle 12 and near the upper or divergent end, it is provided with a rearwardly extending rod or other rigid member 103 extending 30 is provided with a rearwardly extending rod or other rigid member 103 extending generally normal to the back surface of baffle 13. Rod 103 extends through the hole at the upper end of leg 79 of bracket 71. Rod 103 may be threaded, at least near its remote end and a pair of nuts 104 and 105 are provided on opposite sides of leg 79 so that the angular position of baffle 13 may be adjusted by adjusting these nuts.

On its front side baffle 13 may be provided with appropriate guides or the like to direct the flow of material thereover. For example, it has been found desirable to use a piece of angle iron extending generally parallel to the left-hand side or edge of the baffle (as seen in FIG. 4) and spaced approximately one-third of the way across the bottom from this left-hand side. This angle member is simply L-shaped in cross section and has one leg fastened to the back or base of the baffle member and the other leg extending normal to the baffle member. This assists in directing the material onto the spinner plate. It will be appreciated that the positioning of this member 106 may be varied or it may be omitted altogether, depending upon the volume, density, and other characteristics of the material which is being distributed.

The relative positions of the various parts of the distributor can perhaps best be seen by referring to FIG. 6. As seen there, baffle 13 is preferably disposed in a position so that it is spaced upwardly a short distance from the face of distributor disc 12 with its lower end generally parallel to but spaced upwardly and rearwardly from a horizontal diameter on the spinner disc. Preferably it is positioned so that an extension of the back or base of baffle 13 would intersect the distributor disc substantially on the horizontal diameter. By reference to FIG. 4, it can be seen that the width of the bottom or convergent end of baffle 13 is slightly less than the radius of distributor disc 12 and baffle 13 is slightly less than the radius of distributor disc 12 and baffle 13 is disposed to one side of the center of disc 12 so that material will be guided onto the disc substantially on this radius. As also seen in FIG. 4, baffle 13 is mounted so that the axis of the motor (the orbit axis) extends through the transverse center portion of the baffle.

When the distributor is mounted on the supporting structure disclosed in FIG. 1, baffle 13 will be disposed substantially at the center of the silo, immediately beneath the inner end of gooseneck 14. Referring again to FIG. 6, it will be seen that the base of baffle 13 forms an angle $\alpha$ with respect to a vertical line. Distributor disc 12 is inclined so that it forms an angle $\beta$ with respect to the horizontal. The difference between these two angles is the angle $\gamma$. Testing has indicated that the angle $\beta$ should be approximately 15° and 45° with an optimum believed to be at approximately 30°. Experimentation has indicated that the angle $\alpha$ may be varied over a relatively wide range, but it is believed that an optimum position is obtained where $\alpha$ is approximately equal to $\beta$. Thus an optimum position, particularly for relatively high-density material appears to be with $\alpha$ approximately equal to $\alpha$ and both of these angles being equal to approximately 30°. In this instance the angle $\gamma$ between baffle plate 13 and disc 12 will also be approximately the same or approximately equal to 30°.

The function of the distributor apparatus will now be described. The distributor is mounted on arm 28 of the carriage 24 by connecting means 30 or by other appropriate means so that it is disposed substantially at the center of the silo with the baffle or guide means 13 disposed immediately beneath the end of gooseneck 14. This relative position is disclosed in FIG. 1 where the distributor is disclosed somewhat schematically and not necessarily in exact scale with the gooseneck which is somewhat exaggerated in size. The motor is disposed so that its axis extends vertically and disc 12 makes an acute angle of, for example, 30° with the horizontal while baffle 13 makes an equal angle with the vertical. Motor 11 is energized and rotates shaft 32 in a counterclockwise direction (as seen in FIG. 2) thus driving sprocket 64 in a similar direction. This sprocket drives sprocket 56 through chain 67, rotating shaft 54 and with it sprocket 55 and disc 12, also in this direction. Sprocket 55 is connected by chain 70 to sprocket 61 rotating it, shaft 60 and sprocket 62 also in a counterclockwise direction. Since sprocket 33 is fixed to the fixed motor 11, it can not move and sprocket 63 now walks around within chain 66, carrying with it bearing member 34 including deck 40 on which the sprockets and the distributor disk are mounted, causing them to orbit in a generally horizontal path about the axis of the fixed motor. At the same time, disc 12 is rotating in a moving plane which is inclined with respect to the horizontal, the power being transmitted through universal joints 82 and 83. Since bracket 71 is mounted on bearing member 34, it also rotates with this member causing it, and baffle 13 which is mounted thereon, to orbit with the distributor disc. However, since baffle 13 is disposed closer to the center of motor 11 about which the orbiting takes place, it has a much smaller orbit path. As can be seen in the drawing, baffle 13 is mounted so that it is disposed over the axis of motor 11 (so this axis passes through the baffle) so that the baffle is disposed under gooseneck 14 in all positions of the baffle. It will be appreciated that if this axis extends generally through the transverse center of baffle 13, as in FIG. 4, the baffle will rotate about this center and will continually be centered under the gooseneck when the distributor is at the center of the silo. As material moves from gooseneck 14 onto baffle 13, its direction of movement is changed by approximately 30°. It is then directed onto disc 12 substantially at a radius of the disc and again its direction of movement is changed by approximately 30°. The spinning disc throws the material outwardly from the disc. However, a portion of the material striking the disc bounces or deflects off and is distributed at least partially due to the force of gravity.

Preferably the orbital movement is at a much slower speed than is the rotation of the disc. In one arrangement, disc 12 rotated at approximately 250 r.p.m. while the orbital movement was at a rate of approximately 8 r.p.m. It will be appreciated that these speeds may be varied since the optimum speed will depend somewhat upon the density of the material being distributed and the rate at which it is being feed onto the distributor disc. It should be understood that motor 11 may be a variable speed motor and that an appropriate speed control may be provided so that the speed may be adjusted as desired. It will also be appreciated that the angle between disc 12 and the horizontal and between baffle 13 and the vertical may be varied without departing from the spirit of the invention. In addition, it will be appreciated that the arrangement wherein motor 11 is fixed and the orbiting is done about the axis of the motor may be used in distributors where the disc is disposed horizontally and with or without baffle 13. By having the motor frame act as a frame for the entire distributor and having the orbital path about the center of the motor, the structure is greatly simplified since mounting of the entire distributor may be made by a quickly removable connection as is disclosed at numeral 30 . It will also be appreciated that the inclined disc and the baffle may be utilized without using the fixed motor arrangement disclosed in this application. However, it is believed that these two features in combination provide a most advantageous structure. In addition, it will be appreciated that the particular structure utilized to mount baffle 13 and disc 12 may be varied without departing from the invention as can the particular drive arrangement for distributor. The preferred embodiment herein has been disclosed by way of example and not by way of limitation.

The embodiments of the invention in which I claim an exclusive property or right are defined as follows:

1. In a particulate material distributor of the type having a driving motor and a distributor member which is simultaneously rotated and driven in an orbital path by the driving motor, the improvement comprising: mounting means adapted for connection to a support and for mounting the driver motor in a fixed operating position; and support means on the motor mounting the distributor member for rotation in an orbital path about the fixed position of the motor.

2. The apparatus of claim 1 wherein the motor has an output shaft which is drivingly connected to the distributor member, and wherein the distributor member has a generally circular orbital path substantially concentric with the axis of the output shaft of the motor and generally in a horizontal plane.

3. In a particulate material distributor of the type having a driving motor having a frame and a distributor member which is simultaneously rotated and driven in an orbital path by the driving motor, the improvement comprising: mounting means adapted for connection to a support and for mounting the driving motor in a fixed operating position; and means mounting the distributor member for rotation in an orbital path about the fixed position of the motor, said means for mounting the distributor member including crank arm means and means rotatably mounting said crank arm means on the frame of said motor and for rotation substantially about the axis of the motor, and means mounting the distributor member on the crank arm means in a position spaced from the axis of the driving motor.

4. The apparatus of claim 3 including a fixed driving member mounted on the motor frame, generally concentric with the axis of said motor frame, generally concentric with the axis of said motor, a movable driving member rotatably mounted on said crank arm means in a position spaced from the axis of rotation thereof; drive means operably connecting said movable driving member to the output shaft of said motor; and flexible means drivingly connecting said movable driving member and said fixed driving member whereby rotation of said movable driving member causes said crank arm means to rotate about said motor moving said distributor member in its orbital path.

5. The apparatus of claim 3 wherein the distributor member comprises a rotatable spinner member rotatable in a plane which is inclined with respect to the horizontal.

6. The apparatus of claim 3 including means mounting the distributor member on said crank arm means for rotation about an axis which is inclined with respect to the vertical whereby said distributor member rotates in a plane inclined with respect to the horizontal and orbits in a plane which is substantially horizontal.

7. The apparatus of claim 6 further including guide means for directing particulate material onto the distributor member; and means mounting said guide means in a position spaced above the distributor member wherein it will direct material onto said distributor member, said guide means forming an acute angle with the vertical and an acute angle with the surface of the distributor means, said means mounting said guide means including means reentering said guide means movable in the orbital path along with said spinner means.

8. The apparatus of claim 7 wherein the acute angle between the guide means and the vertical is approximately equal to the acute angle between the distributor member and the horizontal.

9. In a particulate material distributor of the type having a driving motor and a distributor member which is simultaneously rotated and driven in an orbital path by the driving motor, the improvement comprising: mounting means adapted for connection to a support and for mounting the driving motor in a fixed operating position; means for mounting the distributor member for rotation in an orbital path about the fixed position of the motor; and guide means adapted to receive material from a supply means and to direct the material onto the distributor member; and means mounting said guide means for movement with said distributor member in its said orbital path about the fixed position of the motor.

10. In a particulate material distributor of the type having a driving motor and a distributor member which is simultaneously rotated and driven in an orbital path, the improvement comprising: mounting means adapted for connection to a support and for mounting the driving motor in a fixed operating position; crank arm rotatably mounted for rotation about the fixed position of the motor; means rotatably mounting the distributor member on said crank arm means for rotation therewith in an orbital path about the fixed position of the motor; guide means adapted to receive material from the supply means and to direct the material onto the distributor member; and means mounting said guide means for movement with said distributor member in its orbital path about the fixed position of the motor, the means mounting said guide means rendering it nonrotatable with respect to said crank arm means during movement in said orbital path whereby said distributor member rotates with respect to said guide means while said distributor member and said guide means orbit together.

11. Particulate distributor apparatus comprising: motor means; crank arm means rotatable about a generally vertical axis, spinner means; means mounting said spinner means on said crank arm means in a position spaced from the axis of rotation of said crank arm means and rendering said spinner means rotatable with respect to said crank arm means about an axis inclined with respect to the vertical and with said spinner means disposed in a plane generally normal to its axis of rotation; drive means operably connecting the motor means to said crank arm means and to said spinner means whereby operation of said motor means drives said crank arm means and said spinner means so that said spinner means is simultaneously rotated in a plane inclined with respect to the horizontal and orbits in a generally circular path and in a generally horizontal plane.

12. The apparatus of claim 11 wherein the spinner member is inclined with respect to the horizontal by an angle between approximately 150° and approximately 45°.

13. The apparatus of claim 11 wherein the spinner means is inclined so that it lies in a plane forming an angle of approximately 30° with the horizontal.

14. The apparatus of claim 11 further including guide means for directing particulate material onto the spinner means; and means mounting said guide means in a position spaced above the spinner means and wherein it will discharge material onto said spinner means and wherein it forms an acute angle with the vertical and an acute angle with the surface of the spinner means, said means mounting said guide means including means rendering said guide means movable in the orbital path along with said spinner means.

15. The apparatus of claim 14 wherein the spinner means is a generally circular member rotating about an axis substantially through its center; and said guide means is disposed so that it directs material onto said spinner means on one side of its axis of rotation and substantially onto a radius of said spinner means.

16. The apparatus of claim 14 wherein the acute angle between the guide means and the vertical is approximately equal to the acute angle between the spinner means and the horizontal.

17. The apparatus of claim 14 wherein said guide means forms an angle of between approximately 15° and approximately 30° with the vertical.

18. The apparatus of claim 14 wherein said guide means includes a generally flat back with forwardly extending sides, said sides converging from one end toward the other of said guide means; and said guide means is mounted with the divergent end adapted to receive material from a conveying means and with the convergent end directed toward the spinner means to guide the material thereonto.

19. In a particulate material distributor of the type having a driving motor and a distributor member which is simultaneously rotated and driven in a orbital path, the improvement comprising: guide means for receiving particulate material from the supply means and for directing it onto the distributor member; and means mounting said guide means for movement with said distributor member in its orbital path.

20. The apparatus of claim 19 wherein the guide means includes a generally flat back portion with forwardly extending sides, said sides converging from one end toward the other end of the guide means; and said guide means being mounted with the divergent end adapted to receive material from a supply means and with the convergent end directed towards the distributor member to direct material thereonto.

21. The apparatus of claim 20 wherein said guide means is mounted with its back portion inclined so as to form an acute angle with the vertical and to form an acute angle with the distributor member.

22. In a particulate material distributor of the type having a driving motor and a distributor member which is simultaneously rotated and driven in an orbital path, the improvement comprising: guide means for receiving particulate material from a supply means and for directing it onto the distributor member; and means mounting said guide means for movement with said distributor member in an orbital path, whereby said distributor member rotates with respect to said guide member while the two orbit together whereby material directed by the guide means impinges upon the distributor member in a generally annular path thereon.

23. The apparatus of claim 22 wherein said guide means has a transverse dimension and is mounted so that its transverse center is disposed generally at the center of the orbital path.

24. The apparatus of claim 22 including rotatable crank arm means, means rotatably mounting the distributor member on the crank arm means, and wherein the means mounting the guide member includes means nonrotatably mounting said guide member on said crank arm means.

25. The apparatus of claim 24 wherein the crank arm means is rotatable about a given axis and the guide means is mounted generally above the crank arm means and in a position so that said axis passes through the guide means.

PO-1050
(5/69)

UNITED STATES PATENT OFFICE
CERTIFICATE OF CORRECTION

Patent No. 3,599,878      Dated August 17, 1971

Inventor(s) Floyd E. Buschbom and Glen D. Hansen

It is certified that error appears in the above-identified patent and that said Letters Patent are hereby corrected as shown below:

Column 5, line 27, after "angle" -- $\rho$ -- is omitted.

Column 5, line 39, "position" should be --portion--.

Column 5, line 46, "p" should be omitted.

Column 5, lines 49-51, "30 is provided with a rearwardly extending rod or other rigid member 103 extending" should be omitted.

Column 6, lines 7 and 8, "is slightly less than the radius of distributor disc 12 and baffle 13" is repetitious and should be omitted.

Column 6, line 27, after "equal to", "$\alpha$" should be --$\beta$--.

Column 7, line 70, "frame" should be omitted.

Column 8, line 21, "reentering" should be --rendering--.

Column 8, line 75, "150°" should be --15°--.

Signed and sealed this 23rd day of May 1972.

(SEAL)
Attest:

EDWARD M. FLETCHER, JR.      ROBERT GOTTSCHALK
Attesting Officer               Commissioner of Patents